United States Patent Office 3,491,228
Patented Jan. 20, 1970

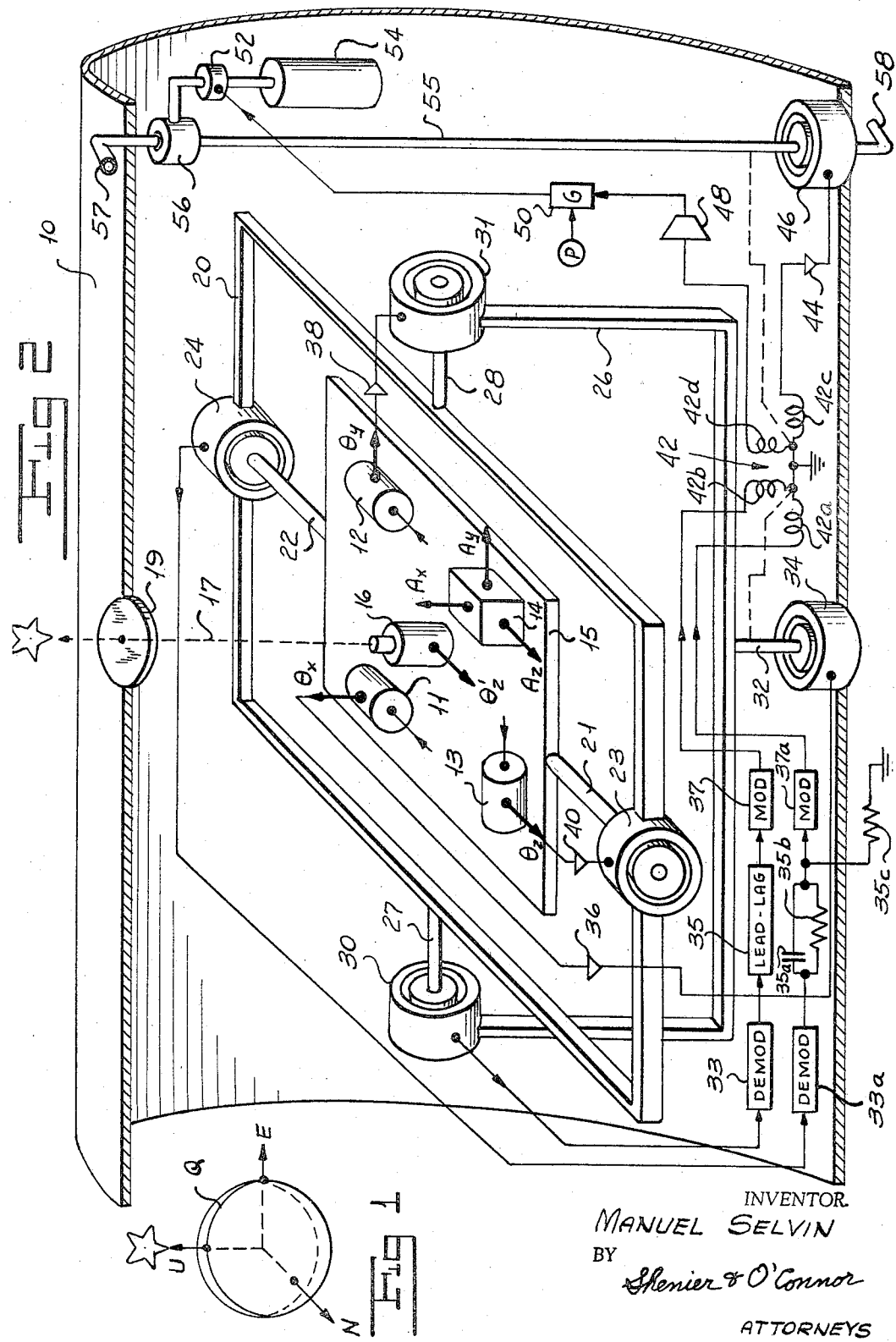

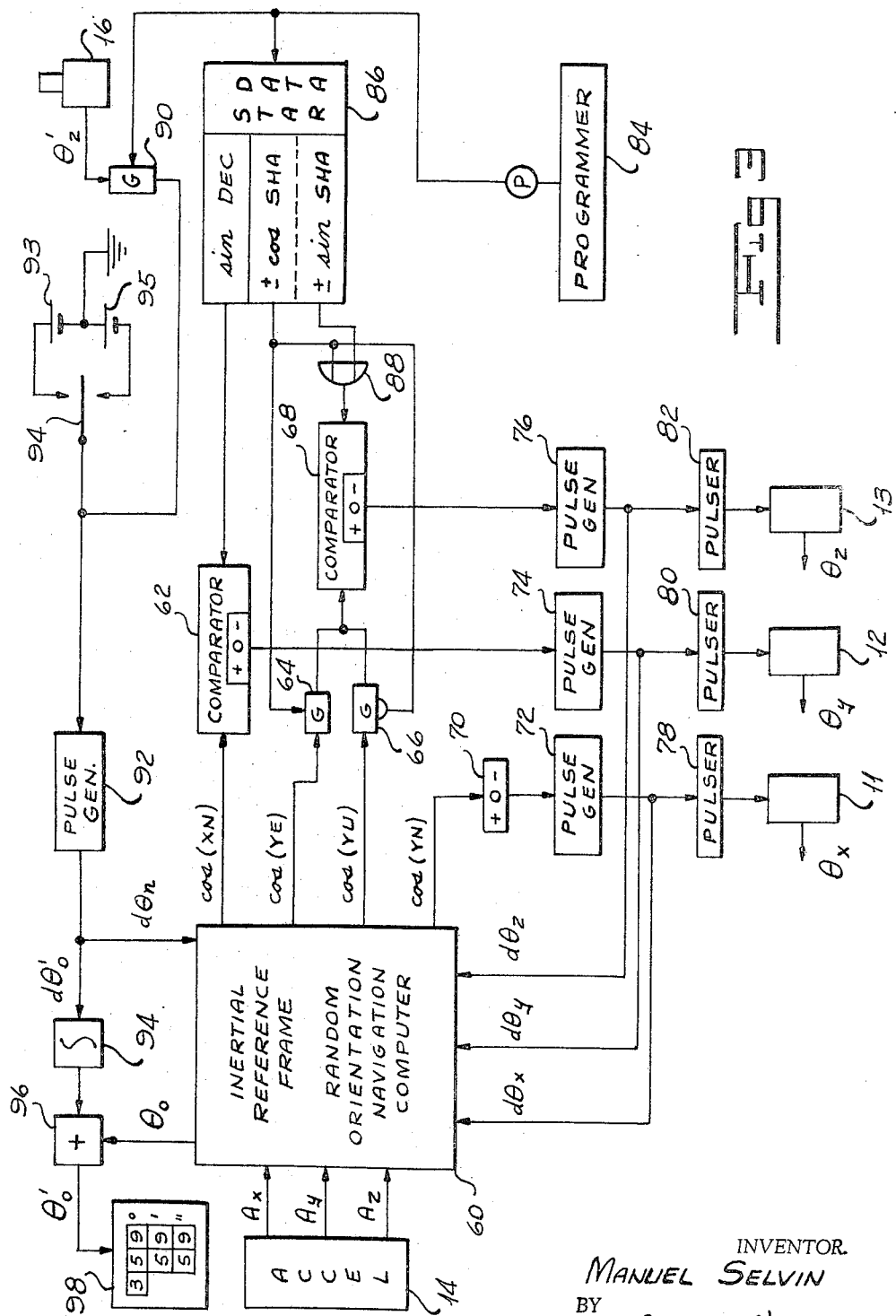

3,491,228
STELLAR-INERTIAL PLATFORM SYSTEM
Manuel Selvin, Norwalk, Conn., assignor to United Aircraft Corporation, East Hartford, Conn., a corporation of Delaware
Filed July 1, 1963, Ser. No. 291,936
Int. Cl. G06f 15/50; G06g 7/78
U.S. Cl. 235—150.25                                    11 Claims

ABSTRACT OF THE DISCLOSURE

A gimbal-isolated platform includes orthogonally disposed gyroscopes and accelerometers. The gyroscope outputs drive gimbal servomotors which stabilize the platform in a reference frame. Conveniently this reference frame is inertial, and therefore independent of earth rotation as well as vehicle latitude and longitude, so that star data in the form of the direction cosines of sidereal hour angle and declination may be directly employed without coordinate transformation. A star sensor is mounted on the platform and is aligned with an optical aperture in the body of the missile provided that the gimbal angle transducers are in their null positions. The accelerometer outputs are coupled to an inertial reference frame navigation computer. In order to take a star sight the platform must be displaced from alignment with the inertial reference frame so that the star sensor may be aligned with a star. Two difficulties now arise: firstly, the accelerometers would be skewed from alignment with the inertial reference frame; secondly the optical aperture in the missile would no longer be aligned with the star sensor. In order to overcome the first difficulty I provide a navigation computer of the random orientation type. Such computer provides direction cosines relating the orientation of the accelerometers and gyroscopes to the reference frame. The star data direction cosines are then compared with the direction cosines relating the orientation of the platform to the reference frame. Any difference between corresponding cosines is used simultaneously to torque the gyroscopes and apply corresponding angular corrections to the random orientation navigation computer. The second difficulty is overcome by employing the signals from the gimbal angle transducers to control missile attitude so that such signals are nulled. With the line of sight between star sensor and star thus unblocked the star sensor outputs are now employed simultaneously to change the orientation of the inertial reference frame and to make corresponding corrections in indicated latitude and longitude.

Description of the invention

In the accompanying drawings which form part of the instant specification and which are to be read in conjunction therewith and in which like reference numerals are used to indicate like parts in the various views:

My invention relates to stellar-inertial platform systems and more particularly to inertial platform systems in which a sight on a celestial body is used to correct navigational errors.

In the prior art, star sensors have been either fixedly connected to the body of a vehicle or movably mounted on a stabilized platform. If the star sensor is fixedly connected to a flight vehicle such as a missile, then star sights require extremely accurate control of missile attitude to position and maintain the star in the center of the field of view of the sensor. Because of the inadequacies of missile attitude controllers, the star sensor itself must exhibit high linearity and stability and frequency to obtain even moderate accuracy in taking star sights "on the fly."

Mounting the star sensor for movement independently of the inertial reference avoids the foregoing problems relating to missile attitude control at the expense of undue weight and bulk in providing additional gimbals. Furthermore, gimbal angle transducers must be provided having high accuracy over a wide range of angles. Moreover, complex coordinate transformations arise, necessitating the provision of additional computers.

Missile star sensors may be provided with only a limited optical aperture for both aerodynamic and structural reasons. This mitigates against the use of additional gimbals mounting the star sensor for movement relative to a stabilized platform. Accordingly the prior art favors mounting the star sensor fixedly to the missile body.

All inertial navigation systems provide for the isolation of the accelerometers from rotations of the vehicle. Gyroscopes are used for such isolation. In one type of system the gyroscopes drive gimbals which physically isolate the platform-mounted accelerometers from vehicle rotations. In another type of system the gyroscope outputs are coupled to a random orientation computer which computationally isolates the outputs of the vehicle-mounted accelerometers from the vehicle rotations to which the accelerometers are physically subjected. Such system is termed "strapdown" since the accelerometers are "strapped" to the vehicle rather than physically isolated by gimbals. A complete strapdown system is shown in the copending application of Josept Yamron and Andrew E. Scoville for Random Orientation Inertial System, filed Jan. 15, 1962, now Patent No. 3,272,972.

I have invented a stellar-inertial platform system in which star sights are obtained without the necessity for high accuracy in missile attitude control. In my system the star sensor need not have high linearity and frequency response. My system further eliminates stringent accuracy requirements upon gimbal transducers.

One object of my invention is to provide a stellar-inertial platform system in which only coarse missile attitude control is needed for a star sight.

Another object of my invention is to provide a stellar-inertial platform system which may employ a star sensor having low linearity and speed of response.

A further object of my invention is to provide a stellar-inertial platform system which may employ angle transducers of low accuracy.

Other and further objects of my invention will appear from the following description.

FIGURE 1 is an orthographic view showing the orientation of the inertial reference frame.

FIGURE 2 is a perspective view with parts broken away showing the mechanical configuration of the platform components and their cooperation with the missile attitude controller.

FIGURE 3 is a schematic view showing the remaining components of the system.

More particularly referring now to FIGURE 1, I advantageously use an inertial reference frame having orthogonally disposed axes N, E, and U. The N axis is parallel to the earth's polar axis. The E and U axes are othogonally disposed in a plane parallel to that of the earth's equator Q and fixed relative to the stars. Preferably the U axis may coincide with the first point of Aries from which sidereal hour angle measurements are made.

Referring now to FIGURE 2, mounted upon a platform 15 are three single degree of freedom gyroscopes 11, 12, and 13, an accelerometer unit 14, and a star sensor 16. Gyroscopes 11 through 13 measure the rotations $\theta_x$, $\theta_y$, and $\theta_z$ about orthogonally disposed X, Y and Z platform axes. In the position of platform 15 shown the X, Y, and Z axes are parallel to the U, E, and N axes, respectively. The accelerometer unit 14 measures the accelerations $A_x$, $A_y$, and $A_z$ along the X, Y, and Z axes respectively. The star sensor 16 provides an output $\theta'_z$ in accordance with angular deviations of the line of sight 17 to a star about the Z axis. The output $\theta'_z$ is nulled when the line of sight 17 is in a plane containing the X and Z axes. In the embodiment of the invention shown, angular deviations of the line of sight 17 about the Y axis are not needed. Star sensor 16 may have a field of view of 1°. Platform 15 is supported by a pair of stub shafts 21 and 22 secured to the respective rotors of Z axis servomotor 23 and gimbal angle transducer 24, the stators of which are mounted in a gimbal 20. Gimbal 20 is supported by a pair of stub shafts 27 and 28 secured to the respective rotors of Y axis servomotor 31 and gimbal angle transducer 30, the stators of which are secured to a half gimbal 26. Gimbal 26 is supported by a stub shaft 32 secured to the rotor of an X axis servomotor 34 the stator of which is secured to the interior cylindrical wall 10 of a missile. An optical aperture 19 in the wall 10 of the missile is positioned diametrically opposed to servomotor 34 in alignment with shaft 32. Aperture 19 may subtend a 3° field of view. Gimbal 26 is fragmented so that the line of sight 17 is not obscured. The pickoff outputs of gyroscopes 11 through 13 are coupled through respective amplifiers 36, 38, and 40 to servomotors 34, 31, and 23. I provide a resolver indicated generally by the reference numeral 42 having a pair of rotor windings 42a and 42b disposed electrically at 90° which are mechanically coupled to rotate in synchronism with the rotor of servomotor 34. Resolver 42 is provided with a pair of stator twindings 42c and 42d having an electrical separation of 90°. Gimbal angle transducers 24 and 30 may be synchros. he output of Y axis transducer 30 is coupled to a phase-sensitive demodulator 33. The output of demodulator 33 is coupled through a lead-lag network 35 to a madulator 37 and thence to one terminal of rotor winding 42b. The output of Z axis transducer 14 is coupled to a phase-sensitive demodulator 33a. The output of demodulator 33a is coupled to one terminal of a parallel circuit comprising capacitor 35a shunted by resistor 35b. The other terminal of the parallel circuit is coupled to ground through resistor 35c. Components 35a through 35c comprise a lead-lag circuit identical to circuit 35. The output across resistor 35c is coupled through a demodulator 37a to one terminal of rotor winding 42a. The other terminals of winding 42a and 42b are grounded. A supply 54 of mono-propellant fluid is coupled through a solenoid valve 52 to a rotational coupling 56 and thence to a conduit 55 which is aligned with stub-shaft 32. Conduit 55 extends along a diameter of the cylindrical wall 10 of the missile and terminates in respective converging-diverging nozzles 57 and 58 externally of the missile. In the rotational position of the conduit 55 shown, nozzle 57 exhausts propulsive fluid along the $+Z$ axis while nozzle 58 exhausts fluid along the $-Z$ axis. Thus in the position shown the reaction forces produce a reaction torque causing an angular acceleration clockwise about the $-Y$ axis (clockwise from the right, looking to the left). Conduit 55 is secured to the rotor of a servomotor 46, the stator of which is secured to the interior wall 10 of the missile. The stator of resolver 42 is mechanically coupled to rotate in synchronism with conduit 55 and the rotor of servomotor 46. One terminal of winding 42c is coupled through an amplifier 44 to servomotor 46. One terminal of winding 42d is coupled to the input of a hysteresis circuit 48. Hysteresis circuit 48 may comprise a normally "off" flip-flop which is not triggered "on" unless the A=C output of winding 42d exceeds a predetermined level. The output of hysteresis circuit 48 is coupled through a gate 50 to the solenoid actuator of valve 52. Gate 50 is actuated by a signal P from a programmer (FIGURE 3). The other terminals of winding 42c and 42d are grounded. Gyroscopes 11, 12 and 13 are provided with torquing inputs which are more particularly shown and described in conjunction with FIGURE 3.

Referring now to FIGURE 3, the $A_x$, $A_y$, and $A_z$ outputs of accelerometer unit 14 are coupled to a random orientation navigation computer 60 having an inertial reference frame. As pointed out in detail in the aforementioned copending application of Yamron and Scoville, computer 60 provides nine direction cosine outputs and more particularly the direction cosines cos(XN), cos(YE), cos(YU), and cos(YN). All nine direction cosines are required to define the orientation of the X, Y, and Z axes relative to the N, E, and U axes. The cos(XN) output of computer 60 is coupled to one input of a comparator 62. The cos(YE) and cos(YU) outputs are connected to the inputs of respective gates 64 and 66. The outputs of gates 64 and 66 are coupled to one input of a comparator 68. The cos(YN) output is coupled to a plus-zero-minus circuit 70. Circuit 70 provides a three-condition output which indicates whether its input is equal to zero or is greater than zero (positive) or is less than zero (negative). Each of comparators 62 and 68 provide the same three-condition plus-zero-minus output as circuit 70. The outputs of circuits 70, 62, and 68 are coupled to respective pulse generators 72, 74, and 76. Each pulse generator provides either positive pulses or negative pulses or no pulses at all in accordance with the value of its corresponding three-condition input. The outputs of pulse generators 72, 74, and 76, respectively representing $d\theta_x$, $d\theta_y$, and $d\theta_z$, are coupled to computer 69 and to corresponding pulsers 78, 80, and 82. Pulsers 78 through 82 provide analog output current pulses of predetermined current-time integral which are coupled to the respective torquing inputs of gyroscopes 11, 12, and 13. The physical angular increments provided by thte pulsers to the gyroscopes should be precisely scaled to equal the computational angular increments provided by the pulse generators to the random orientation computer. A programmer 84 provides an output P which is coupled to a star data source 86. Source 86 provides information defining the position of various stars which may be viewed along the anticipated flight path of the missile. For each star, source 86 provides the sine of declination and either the positive or the negative value of either the cosine or the sine of the sidereal hour angle. The sin DEC output of source 86 is coupled to the other input of comparator 62. The ±cos SHA output of source 86 is coupled to one input of an OR circuit 88 and to an inhibiting input of gate 66, and further actuates gate 64. The ±sin SHA output of source 86 is coupled to the other input of OR circuit 88. The output of OR circuit 88 is connected to the other input of comparator 68. Comparators 62 and 68 may comprise conventional digital subtraction circuits. The $\theta'_z$ output of star sensor 16 is coupled through a gate 90 to a pulse generator 92 which provides either positive pulses or negative pulses or no pulses at all in agreement with the voltage at its input. Gate 90 is actuated by the P programmer output. Also coupled to in the input of pulse generator 92 is the armature of a spring-centered double-throw switch 94. In the spring-centered position shown, the armature of switch 94 provides no voltage. However, switch 94 may be manually actuated to couple either positive voltage from a battery 93 or negative voltage from a battery 95 to the input of pulse generator 92. The negative terminal of battery 93 and the positive terminal of battery 95 are grounded. The outputs of pulse generator 92 not only represent $d\theta_n$ corresponding to incremental angular corrections about the N axis of the inertial reference frame but also represent $d\theta'_0$ corresponding to incremental angular corrections of longitude. The output of pulse generator 92 is coupled to the $d\theta_n$ input of computer 60. Computer 60 further provides assumed or dead reckoning longitude $\theta_0$. The output of pulse generator 92 is coupled to an integrator 94. The output of integrator 94 and the $\theta_0$ output of computer 60 are combined in an adding circuit 96 the output of which represents $\theta'_0$ corresponding to corrected longitude. The output of adding circuit 96 is coupled to a visual display device 98 which indicates corrected longitude in degrees, minutes, and seconds for example.

If source 86 provides no output cos SHA, then gate 66 is enabled and gate 64 is disabled. However, if source 86 provides a cos SHA output, then gate 64 is enabled while gate 66 is disabled. It will be noted that the selective enabling and disabling of gate 64 and 66 causes either cos(YE) or cos(YU) to be coupled to the first input of comparator 68.

The following table shows the relationships among the sidereal hour angle quadrant of a star, the particular function of the sidereal hour angle provided by the star data source 86, and the corresponding direction cosine provided by computer 60 which is coupled to the first input of comparator 68.

| SHA | f(SHA) | Enable |
| --- | --- | --- |
| 315°–45° | +sin SHA | cos (YU) |
| 45°–135° | +cos SHA | cos (YE) |
| 135°–225° | −sin SHA | cos (YU) |
| 225°–315° | −cos SHA | cos (UE) |

In the aforementioned copending application of Yamron and Scoville, for the inertial reference from no $d\theta_n$ input is required for computation of direction cosines. However, since my invention contemplates the use of an auxiliary $d\theta_n$ input, it is necessary that direction cosines be computed in the manner shown in FIGURES 3 and 4 of said copending application. It will be appreciated, however, that with this one exception the remaining instrumentation of the nevigation computer 60 of my application will be shown in FIGURE 2 of the aforementioned copending application.

In operation of my invention, with the missile on the ground and not moving over the surface of the earth so that the velocity of the vehicle is known to be zero and extraneous maneuvering accelerations are known to be absent, the inertial reference is inherently established by introducing damping into computer 60, as will be appreciated by those skilled in the art and as is true for any closed loop inertial system subjected to the constant angular rotation of the earth. The computer is preferably quickened from its normal Schuler tuning to reduce the time period for establishing the inertial reference. This inertial reference is substantially perfect for both latitude and north, since these are inherently defined by the polar axis of the earth about which the angular rotation takes place. Thus the alignment of the N axis with the earth's polar axis is substantially perfect. However, no inertial system can detect or correct errors in longitude. It is assumed that the initial launch position of the missile is known to within ±30 nautical miles or ±0.5° of longitude. Hence while the missile is on the ground, switch 94 is actuated until the indicated longitude provided by visual display 98 agrees with assumed longitude. The same output from the pulse generator 92 which is coupled through integrator 94 and adding circuit 96 to the visual display 98 is also coupled to the $d\theta_n$ input of computer 60. Thus before launch it is known that the inertial reference frame is oriented in sidereal longitude to the first point of Aries within ±0.5°. Before launch, programmer 84 provides no output; and the second inputs of each of comparators 62 and 68 are zero. Furthermore the absence of a cos SHA output from star data source 86 enables gate 66. If the Y axis is not disposed at 90° relative to the N axis, then cos(YN) will not be zero; and circuit 70 will provide an output. This output causes generator 72 to provide $d\theta_x$ pulses to computer 60. At the same time pulser 78 torques gyroscope 11. This produces a $\theta_x$ output which through amplifier 36 drives servomotor 34, rotating the platform 15 about the X axis. It is again to be emphasized that each computational increment $d\theta_x$ to computer 60 should correspond to the physical rotation produced by each current pulse from pulser 78. Similarly if the X axis is not disposed at 90° relative to the N axis then cos(XN) will not be zero; and comparator 62 will provide an output. This output causes generator 74 to provide $d\theta_y$ pulses to computer 60. Simultaneously pulser 80 torques gyroscope 12, which produces a $\theta_y$ output. Such output causes amplifier 38 to drive servomotor 31, rotating platform 15 about the Y axis. Finally, if the Y axis is not disposed at 90° relative to the U axis, then cos(YU) will not be zero. The cos(YU) output is coupled through gate 66, producing an output from comparator 68, which causes pulse generator 76 to provide incremental angular corrections $d\theta_z$ to computer 60 and corresponding current pulses from pulser 82 to gyroscope 13. The $\theta_z$ output of gyroscope 13 drives servomotor 23 through amplifier 40, thereby rotating the platform 15 about the Z axis. Accordingly in the absence of signals from start data source 86, the direction cosine outputs of computer 60 torque the gyros, thereby reorienting the platform, and simultaneously apply incremental angular corrections corresponding to such platform rotations to computer 60. When the direction cosines cos(XN), cos(YU), and cos(YN) are zero, the X, Y, and Z axes coincide with the U, E, and axes respectively.

Immediately prior to launch, the dampening and quickening of computer 60, which establishes the N axis of the inertial reference frame, are removed; and the system is restored to undampened Schuler tuning. After launch, when the missile is at an altitude sufficient to preclude sky cover, programmer 84 provides a P output causing source 86 to provide the direction cosines of declination and sidereal hour angle of a preselected star. Since it is the purpose of the star sight to correct essentially for errors in assumed or dead reckoning longitude, as latitude and north corresponding to the N reference frame axis have already been established on the ground, it is desirable that a star have a declination which does not appreciably exceed, for example, ±60°. Polaris which has a declination of nearly 90° would be a very poor star from which to establish longitude. Accordingly, it is not necessary to provide the cosine of declination, since this would be necessary only in viewing stars having declinations near ±90°. The sin DEC output of source 86 is coupled to the second input of comparator 62, which drives not only platform 15 about the Y axis but also the $d\theta_y$ input of computer 60 until cos(XN) is equal to sin DEC. The rotation of platform 15 about the Y axis causes movement of the X axis out of equatorial plane Q. It will be noted that at all times cos(YN) is maintained zero, so that the Y axis always lies in the equatorial plane Q and may thus be used as a reference axis for positioning the platform in accordance with the sidereal hour angle of a star. From the foregoing table relating $f(SHA)$ to quadrants of sidereal hour angles of stars, it will be seen that the sine function is selected for sidereal hour angles near 0° and 180° while the cosine function is selected for sidereal hour angles near 90° and 270°. It will be appreciated that the cosines of angles near 0° and the sines of angles near 90° are substantially unity and the slopes of these functions in such regions are substantially zero, so that no useful positioning information can be provided. Accordingly the star data source 86 should provide that function, whether the sine or cosine of the sidereal hour angle, which is closer to zero. Hence I provide that function of sidereal hour angle which does not exceed a 0.707 value. If the sidereal hour angle of a selected star is 0°, then source 86 would provide a +sin SHA output of zero. Gate 66 remains enabled; and the platform remains in the position shown. If the sidereal hour angle of a selected star is 90°, source 86 would provide a +cos SHA output of zero. Such output enables gate 64 and disables gate 66. When the Y axis is aligned with the E axis as shown, cos(YE) is unity. Accordingly comparator 68 provides an output which, through pulse generator 76, not only provides incremental angular inputs $d\theta_z$ to computer 60 but also, through pulser 82, causes rotation of the platform about the Z axis through 90° so that cos(YE) becomes zero. It will be noted that with the X axis tilted from the equatorial plane Q, rotations of the platform about the Z axis tend to cause movements of the Y axis out of the equatorial plane. However, at all times the cos(YN) output causes the platform to rotate about the X axis until the Y axis is returned to plane Q. The external signals from the start data source 86 superimposed on the system through comparators 62 and 68 cause the X axis to be oriented to the star precisely in declination and to within ±0.5° sidereal hour angle. The nominal line of sight 17 coincides with the X axis. However such line of sight is obstructed since it no longer coincides with window 19. It will be noted that this line of sight is stabilized in inertial space since star sensor 16 is mounted on the fully stabilized platform 15.

It now remains to reorient the missile so that the optical aperture 19 coincides with the line of sight 17 and hence with the X axis. In the position of platform 15 and of the nozzles 57 and 58 shown, the electrical axis of rotor winding 42a is aligned with that of stator winding 42c; and the electrical axis of rotor winding 42b; is aligned with that of stator winding 42d. Assume that the star data from source 86 causes a slight clockwise rotation of platform about the —Y axis (clockwise from the right, looking to the left). If the attitude of the missile remains constant then an output is produced from Y axis transducer 30 which is coupled through demodulator 33, lead-lag network 35, and modulator 37 to winding 42b. If conduit 55 and the nozzles 57 and 58 are slightly displaced from the position shown then a voltage will be induced in winding 42c which will, through amplifier 44, drive servomotor 46, returning the nozzles and conduit 55 to the position shown. The error signal from transducer 30 appearing in winding 42b produces an equal voltage in winding 42d which is coupled to hysteresis flip-flop 48. Hysteresis flip-flop 48 conveniently may provide an output only if the angular error of the line of sight 17 from the center of window 19 exceeds 0.5°. It will be appreciated that with fields of view of 1° for star sensor 16 and 3° for aperture 19, the line of sight 17 may deviate from the center of window 19 by as much as 1° before the optical aperture 19 restricts any portion of the field of view of sensor 16. Accordingly flip-flop 48 may have a hysteresis level which is appreciably less than 1° but appreciably greater than 0°. With an angular deviation of line of sight 17 of more than 0.5° from the center of window 19, flip-flop 48 provides an output which is coupled through gate 50, opening the solenoid valve 52, permitting propellant fluid from supply 54 to be expelled through nozzles 57 and 58, and causing an angular acceleration of the missile clockwise about the —Y axis. The lead-lag circuit 35 prevents overshoot by causing the signal at winding 42b to reverse in polarity before the output of transducer 30 becomes zero. This indicates that the angular velocity of the missile must be reduced in order that window 19 arrive aligned with the line of sight 17 with zero angular velocity. The reversal of polarity of the signal impressed on winding 42b causes the position of conduit 55 shown to represent an unstable null for winding 42c. In order to reach the true null, servomotor 46 rotates conduit 55 and the stator of resolver 42 180°. The propulsive fluid expelled through nozzles 57 and 58 now produces a counterclockwise acceleration of the missile about the —Y axis reducing its clockwise velocity.

In a similar fashion if the line of sight is slightly rotated from the position shown clockwise about the —Z axis (clockwise from the front, looking to the rear), and the missile remains stationary, then an output is produced from Z axis transducer 24 which couples a corresponding signal to rotor winding 42a. This produces a signal in stator winding 42c which causes servomotor 46 to rotate conduit 55 90° clockwise about the —X axis (clockwise from above, looking down), so that nozzle 57 exhausts fluid along the —Y axis while nozzle 58 exhausts fluid along the +Y axis. This produces an angular acceleration of the missile clockwise about the —Z axis. Again the lead-lag circuit comprising components 35a through 35c provides anticipation, so that the signal in winding 42a reverses polarity before the output of transducer 24 becomes zero. This causes rotation of conduit 55 through 180° from the now unstable null to seek a stable null so that nozzle 57 ejects fluid along the +Y axis while nozzle 58 ejects fluid along the —Y axis. This produces an angular acceleration counterclockwise about the —Z axis, reducing the angular velocity of the missile as the center of window 19 approaches alignment with line of sight 17.

It will be seen that rotor windings 42a and 42b which receive signals from transducers 24 and 30 define a resultant magnetic vector indicating the deviation of the center of window 19 from the line of sight 17 in Y–Z platform coordinates. In order to transform the deviation of window 19 in platform coordinates to missile coordinates appropriate for positioning nozzles 57 and 58, it is necessary to drive the rotor of resolver 42 in synchronism with rotation of shaft 32 about the X axis. For example, again assume that the line of sight is rotated clockwise from the position shown about the —Y axis. If the missile has no angular velocity then the position of nozzles 57 and 58 shown is proper to produce a clockwise angular acceleration of the missile about the —Y axis as has been previously described. However, assume that the missile is rotated 90° clockwise about the —X axis. In such event the orientation of the nozzles relative to inertial space should still remain parallel to the N axis. Yet the nozzles should now extend longitudinally of the missile rather than athwartship as in the position shown. Such 90° clockwise rotation of the misile about the —X axis will cause a corresponding 90° rotation of rotor windings 42a and 42b of the resolver. This will cause conduit 55 to rotate 90° relative to the missile wall 10 until winding 42c is again at right angles to winding 42b. Thus are the nozzles displaced from the athwartship position to a longitudinal position. Irrespective of rotation of the missile about the X axis, nozzles 57 and 58 will remain aligned with the Z axis in order to correct for rotational errors of the center of window 19 from the line of sight 17 about the Y axis. It will be appreciated that it is not necessary to control rotation of the missile about the X axis defining the line of sight 17. Accordingly star sensor 16 is mounted in alignment with shaft 32 so that the line of sight 17 remains centrally positioned in window 19 despite rotations of the missile about the X axis. If star sensor 16 were not centrally mounted in alignment with shaft 32, then it would be necessary to control missile rotation about the X axis; but in such event rotor windings 42a and 42b should remain stationary relative to the missile, since the coordinate transformation provided by the coupling of shaft 32 to the rotor of resolver 42 would no longer be required.

It will be noted that the missile attitude control is actuated through gate 50 by the same output of programmer 84 which drives star data source 86. Hysteresis flip-flop 48 is provided to reduce the depletion of propellant fluid, since highly accurate missile attitude control is not required. Whenever the angular deviation of the line of sight 17 from the center of window 19 is less than 0.5° (assuming the angular velocity of the missile is relatively small so that the lead-lag circuits are subjected to signals of substantially zero frequency) flip-flop 48 is in its "off" state, solenoid valve 52 is closed, and no propulsive fluid emerges from the nozzles. Moreover the gimbal angle transducers need not have an accuracy greater than 0.25°.

Having thus oriented the platform so that the line of sight 17 which coincides with the X axis is directed toward a star and having thus oriented the missile so that window 19 coincides with the line of sight so that the star is visible, it remains to correct the system for errors in the initial assumer or dead reckoning longitude. The P output from programmer 84 enables gate 90 to couple $\theta'_z$ signals from star sensor 16 to pulse generator 92. It will be appreciated that in this respect the star sensor duplicates the action of switch 94. The output of pulse generator 92 couples $d\theta_n$ signals to computer 60, changing the angular orientation of the inertial reference frame about the N axis, and makes corresponding angular corrections to longitude $\theta'_o$.

It will be appreciated that for any star having a declination other than 0°, the output of star sensor 16 representing $\theta'_z$ is not measured in the equatorial plane Q and thus will not correspond precisely to actual errors in longitud corresponding to angular errors about the N axis of the inertial reference frame. However, the angular errors provided by the star sensor about a Z axis which is not aligned with the N axis are nevertheless used to make $d\theta_n$ corrections to the inertial reference frame provided by computer 60. The necessary coordinate transformations for converting such corrections about the N axis into coresponding rotations about the X, Y and Z axes are already available in the direction cosine outputs of computer 60, so that no further cordinate transformations need be made. The fact that $\theta'_z$ is measured about an axis which does not coincide with the N axis (for stars having declinations other than 0°) however introduces no error when star sensor 16 is nulled. It will be appreciated that, if desired, I may employ angular deviations of the line of sight about the Y axis to correct slight residual errors in latitude and north. However in the embodiment shown it is assumed, and properly so, that the initial alignment of the N axis with the earth's polar axis immediately prior to launching the missile is substantially perfect.

It will be seen that I have accomplished the objects of my invention. The mounting of the star sensor on the platform fully stabilizes such sensor so that the star sights need not be taken on the fly; and the sensor need not have a high speed of response. With a star sensor field of view of 1° and an optical aperture of 3°, the missile attitude control need not be more accurate than 1°. In the embodiment shown a dead spot or hysteresis region of 0.5° is intentionally provided in the missile attitude control system to decrease the consumption of propulsive fluid. Gimbal angle transducers may have a relatively low accuracy of 0.25°, for example. In the taking of star sight, the platform carrying the star sensor is torqued until the output of the star sensor is nulled; and the sensor need not have a high linearity of response from its null position.

It will be understood that certain features and subcombinations are of utility and may be employed without reference to other features and subcombinations. This is contemplated by and is within the scope of my claims. It is further obivous that various changes may be made in details within the scope of my claims without departing from the spirit of my invention. It is, therefore, to be understood that my invention is not to be limited to the specific details shown and described.

Having thus described my invention, what I claim is:

1. A stellar-inertial system including in combination a vehicle, a radiation sensor, means including a three-axis gimbal system for stabilizing the sensor, a first transducer operatively associated with a first gimbal axis, a second transducer operatively associated with a second gimbal axis, a resolver operatively associated with the third gimbal axis, means coupling the first and second transducers to the resolver, and means responsive to the resolver for controlling rotation of the vehicle about the first and second gimbal axes.

2. A stellar-inertial system including in combination a radiation sensor, means including a gyroscope for stabilizing the sensor in a reference frame, computer means providing an output function relating the angular orientation of the sensor to the reference frame, means providing a coordinate of the angular position of a celestial body relative to the reference frame, means for comparing the coordinate with the output function, means responsive to the comparing means for torquing the gyroscope through a certain angle relative to the reference frame, and means for coupling to the computer means a corresponding representation of said angle.

3. A stellar-inertial system as in claim 2 in which the reference frame contains an N axis parallel to the polar axis of the earth, in which the radiation sensor has a null along an X axis, in which the computer means provides the function $\cos(XN)$, and in which the coordinate means provides the sine of the declination of the celestial body.

4. A stellar-inertial system as in claim 2 in which the reference frame contains orthogonally disposed E and U axes parallel to the equatorial plane of the earth, in which the radiation sensor has a null axis and a Y axis which is orthogonally disposed to said null axis, in which the coordinate means provides that one of the two functions $\pm\cos(SHA)$ and $\pm\sin(SHA)$ having an absolute value which does not appreciably exceed 0.7, where SHA is the sidereal hour angle of the celestial body, and in which the computer means selectively provides a corresponding one of the two functions $\cos(YE)$ and $\cos(YU)$.

5. A stellar-inertial system including in combination a radiation sensor, means including a gyroscope for stabilizing the sensor in a reference frame having a certain orientation relative to inertial space, computer means providing a first signal relating the angular orientation of the sensor to the reference frame, means providing a second signal defining the angular position of a celestial body relative to the reference frame, means for comparing the first and second signals, means responsive to the comparing means for torquing the gyroscope through a certain angle relative to the reference frame, means for coupling to the computer means a first input corresponding to said angle, and means responsive to the sensor for coupling to the computer means a second input which causes a certain change in the angular orientation of the reference frame relative to inertial space.

6. A stellar-inertial system as in claim 5 which further includes means responsive to the computer means for providing a coordinate of the position of the system relative to the earth, and means responsive to the sensor for causing a change in said coordinate corresponding to the change in angular orientation of the reference frame.

7. A stellar-inertial system as in claim 5 in which the reference frame contains an axis parallel to the polar axis of the earth and in which the second input causes rotation of the reference frame about said axis, the system further including means responsive to the computer means for providing a representation of longitude, and means responsive to the sensor for causing a change in said representation of longitude corresponding to the rotation of the reference frame.

8. A stellar-inertial system including in combination an enclosure opaque to radiation, a radiation sensor rotationally mounted within the enclosure and having an angular field of view A, the enclosure being provided with an aperture transparent to radiation and having an angular field of view B, where B is greater than A, means responsive to the angular orientation of the sensor relative to the enclosure for providing a signal representing an angular error, a hysteresis circuit, means coupling the signal to the hysteresis circuit, the hysteresis circuit providing an output only if the angular error represented by the signal exceeds a predetermined value which is greater than zero but less than $\frac{1}{2}(B-A)$, and means responsive to the output of the hysteresis circuit for rotationally positioning the enclosure.

9. A stellar-inertial system including in combination a vehicle having an optical aperture, an optical sensor, means for stabilizing the sensor in a certain angular position relative to inertial space, and means responsive to the angular orientation of the vehicle relative to the sensor for rotating the vehicle until the aperture is in approximate alignment with the sensor.

10. A system as in claim 9 wherein the stabilizing means comprises a gimbal system having at least two axes of rotation.

11. An inertial system including in combination a gyroscope having a torquer and a pickoff, means including a servomotor for controlling the angular position of the gyroscope, means for computing the angular orientation of the gyroscope relative to a reference frame, means responsive to the pickoff and independent of the computing means for driving the servomotor, means responsive to the computing means and independent of the pickoff for torquing the gyroscope through a certain angle relative to the reference frame, and means for coupling to the computing means a corresponding representation of said angle.

References Cited

UNITED STATES PATENTS

| | | | |
|---|---|---|---|
| 3,002,097 | 9/1961 | Nuut | 250—203 |
| 3,027,841 | 4/1962 | Dixson | 250—203 |
| 3,194,949 | 7/1965 | Jasperson | 235—151 |
| 3,230,377 | 1/1966 | Smith | 250—83.3 |
| 3,310,876 | 3/1967 | Yamron | 33—61 |
| 3,310,982 | 3/1967 | Yamron | 33—61 |
| 3,350,548 | 10/1967 | Whitaker | 235—150.25 |

OTHER REFERENCES

Horsfall: Stellar-Inertial Guidance Reduces Error, Aviation Week, pp. 73, 75, 76, 79, Mar. 17, 1958.

MARTIN P. HARTMAN, Primary Examiner

U.S. Cl. X.R.

33—226; 73—178; 244—77; 250—203; 343—9